No. 634,382. Patented Oct. 3, 1899.
J. WALSH, Jr.
NUT LOCKING WASHER.
(Application filed Mar. 7, 1899.)

(No Model.)

Witnesses:
Charles De Cou.
Louis W. Whitehead.

Inventor:
James Walsh Jr.
by his Attorneys Howson & Howson

UNITED STATES PATENT OFFICE.

JAMES WALSH, JR., OF PHILADELPHIA, PENNSYLVANIA.

NUT-LOCKING WASHER.

SPECIFICATION forming part of Letters Patent No. 634,382, dated October 3, 1899.

Application filed March 7, 1899. Serial No. 708,120. (No model.)

*To all whom it may concern:*

Be it known that I, JAMES WALSH, Jr., a citizen of the United States, residing in Philadelphia, Pennsylvania, have invented certain Improvements in Nut-Locks, of which the following is a specification.

My invention consists of a nut-locking washer adapted for general use, such as locking the nuts of rail-joints or securing bolts on carriage or wagon axles or upon different parts of machinery, one object of my invention being to so construct such a nut-locking washer as to insure a firm grip of the same upon the bolt when the nut is screwed up, and a further object being to provide for the ready release of the washer from the bolt when it is desired to remove the same. These objects I attain in the manner hereinafter set forth, reference being had to the accompanying drawings, in which—

Figure 1:
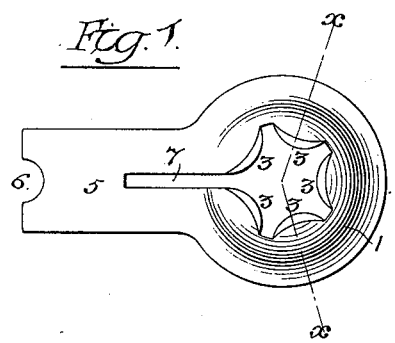
Figure 2:
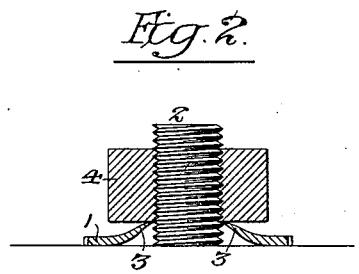
Figure 3:
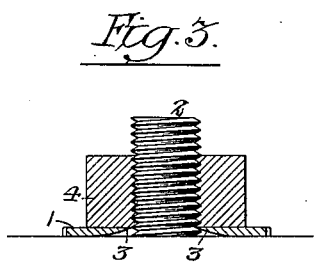
Figure 4:
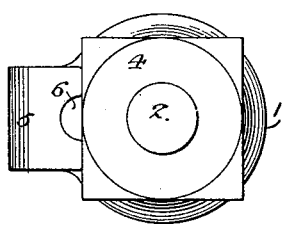
Figure 5:
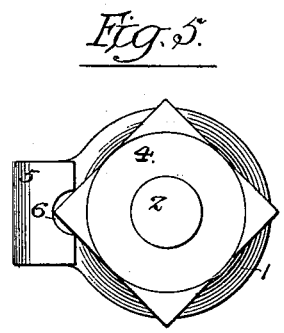
Figure 6:
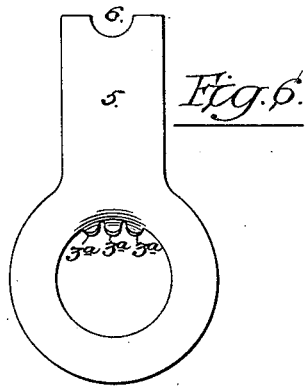
Figure 7:
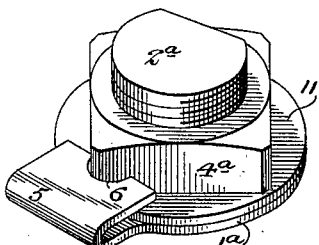

Figure 1 is a plan or top view of a nut-locking washer constructed in accordance with my invention. Figs. 2 and 3 are transverse sections on the line $x\ x$, Fig. 1, showing the washer applied to a bolt and nut, Fig. 2 showing the nut loose, and Fig. 3 showing the nut screwed down. Figs. 4 and 5 are views showing the nut locked in position by the washer, Fig. 4 showing the locking-finger applied to the flat side of the nut, and Fig. 5 showing the locking-finger applied to the angle of the nut. Fig. 6 is a plan view of another form of washer embodying my invention and intended for application to the nuts of carriage or wagon axles. Fig. 7 is a perspective view illustrating the application of this form of washer to the nut.

The washer 1 (shown in Figs. 1, 2, and 3) is of concavo-convex form, or, in other words, cupped or bowl-shaped, and the central opening in the washer for the reception of the bolt 2 is bounded by a series of curved jaws 3, five of these jaws being shown in Fig. 1, so as to form a star-shaped opening in the washer.

Each jaw has its curved or convex edge so formed that when the washer is slipped over the bolt the said convex edges of the jaws will be in contact therewith, as shown in Fig. 2, and when the nut 4 is applied to the bolt 2 and screwed down, as shown in Fig. 3, the flattening out of the washer will cause the curved faces 3 of the jaws to bite into the bolt and take a firm hold thereon, the effect being like that of a vise with five equidistant jaws closing in simultaneously upon the bolt. Owing to the rounded or convex shape of the jaws of the washer each jaw possesses great strength and takes a firm hold upon the bolt at some point on the thread of the same, so that when the washer has been flattened and the jaws compressed turning of the washer on the bolt will be practically impossible until the bite of the jaws upon the bolt is released. Projecting from one side of the washer is a finger 5, which after the nut has been screwed down on the bolt may be turned up so as to engage with said nut, the flat end of the finger engaging with the flat side of the nut, as shown in Fig. 4, or a recess 6 in the end of the finger engaging with the angle of the nut, as shown in Fig. 5, depending upon the extent to which the nut has been turned. Extending from the central opening of the washer out into the finger 3 is a slot 7, which imparts such elasticity to the portions of the washer on opposite sides of the same as to permit said portions of the washer to be sprung apart when the nut has been unscrewed and it is desired to remove the washer, this operation being facilitated when desired by cutting or breaking off the finger 5 at a point inside of the outer end of the slot, so as to form upon the washer two disconnected fingers. By providing a central opening in the washer with a boundary of rounded or convex jaws not only are the strength and good holding power of the latter insured, but an extended bearing is provided for the nut, and the latter is caused to exercise a powerful compressing and flattening influence upon the jaws.

In Fig. 6 I have illustrated my invention as applied to a washer intended for application to a carriage or wagon axle $2^a$, which is flattened at one side. In this case upwardly-inclined rounded or convex jaws are formed upon the flat side of the washer-opening, as shown at $3^a$, so that when the nut $4^a$ is screwed tight upon the axle said jaws will take a firm hold upon the flat face of the axle. The finger 5, projecting from this washer, is adapted to engage either with the flat side of the nut or with the angle of the same, the latter construction being shown in Fig. 7.

The spring-finger may have at the outer end an eye 8 for the reception of a wire or hook, whereby it may be pulled outwardly and held in that position while the nut is being unscrewed, or a piece of tin or other sheet metal may, after the spring-finger has been pulled out so as to clear the notch in the flange of the nut, be introduced between the finger and said flange, so as to prevent the finger from entering the successive notches in the flange as the nut is turned in order to unscrew it.

My improved nut-lock is of cheap construction, as it can be punched at one operation out of sheet-iron, steel, or other metal having the desired qualities.

Having thus described my invention, I claim and desire to secure by Letters Patent—

A nut-locking washer of bowled or dished form having the opening for the reception of the bolt bounded by a series of curved jaws presenting their convex edges to the periphery of the bolt, said washer having, also, a projecting finger for engagement with the nut to lock the same, said finger having therein a slot extending outwardly from the central opening of the washer, substantially as specified.

In testimony whereof I have signed my name to this specification in the presence of two subscribing witnesses.

JAMES WALSH, Jr.

Witnesses:
   WILL. A. BARR,
   JOS. H. KLEIN.